April 15, 1930.  T. J. BARLOW  1,754,302
GUIDE CLIP FOR CUTTER BARS

Filed May 17, 1929

T. J. Barlow, Inventor

Attorneys.

Patented Apr. 15, 1930

1,754,302

UNITED STATES PATENT OFFICE

THOMAS J. BARLOW, OF ALBANY, OHIO

GUIDE CLIP FOR CUTTER BARS

Application filed May 17, 1929. Serial No. 363,863.

This invention relates to a guide clip designed primarily for use in connection with the cutter or sickle bars of mowers.

Heretofore it has been necessary to use bolts of special shapes in order to attach the clip and, when one or more of the bolts has become lost, it has not been possible to use different bolts as efficient substitutes. This has been due to the fact that the heads of the bolts have projected above the clips and grass, etc., has become caught thereon and seriously interfered with the operation of the parts. As a matter of fact the only bolts that could be used in lieu of those ordinarily provided for fastening the clips are carriage bolts and these are not only objectionable for the reasons pointed out but also because they are not made of a size that will allow them to fit properly in the bolt holes formed in the cutter bar.

It is an object of the present invention to provide a guide clip having bolt-receiving openings so shaped that they will not only take the bolts ordinarily provided for this purpose but will also take ordinary reaper and mover bolts as well as bolts of other shapes.

Another object is to provide a clip capable of receiving a bolt having a squared head portion which will rest on the wear plate or the cutter bar and thus prevent the wheels of the guide clip from binding too tightly on the guard bar.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings.

Figure 1:
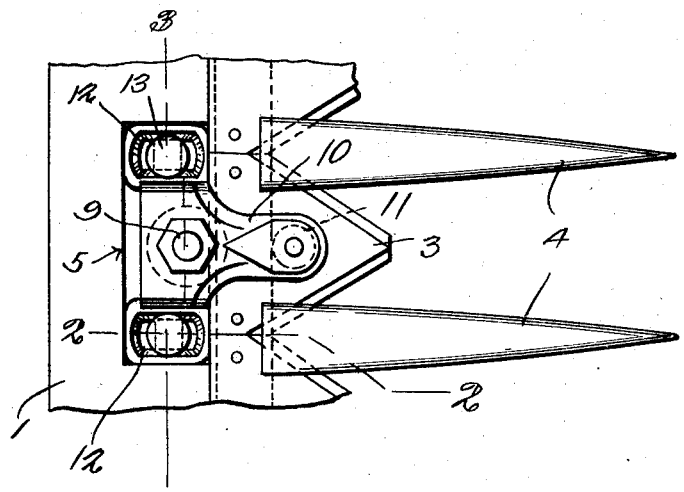
Figure 1 is a top plan view of a portion of a sickle bar and adjacent parts, a clip being shown positioned to guide the bar.
Figure 2:
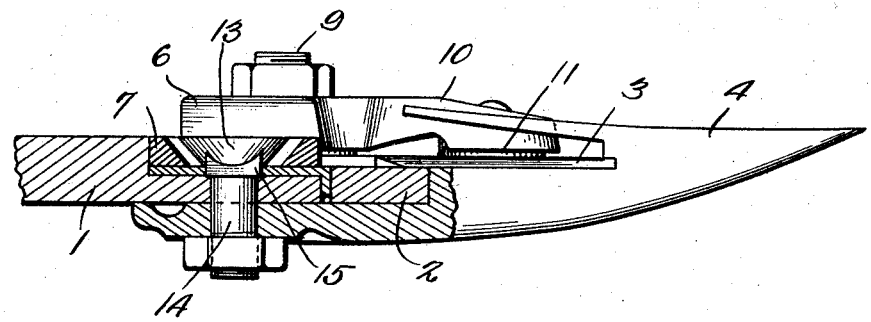
Figure 2 is an enlarged section on line 2—2, Figure 1, the bolt being shown in elevation.
Figure 3:
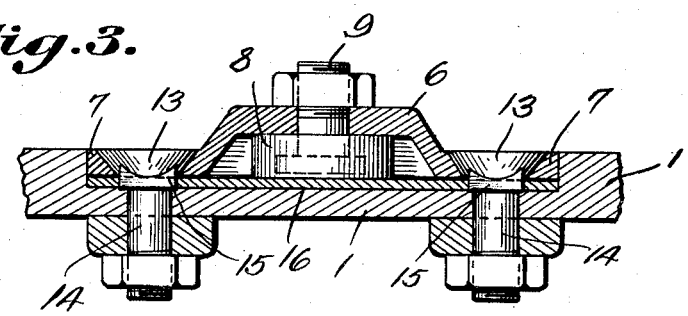
Figure 3 is an enlarged section on line 3—3, Figure 1.

Referring to the figures by characters of reference, 1 designates a guard bar of a mower supporting a sickle bar 2 the blades or sections 3 of which are adapted to work within and between the fingers 4.

The guard bar is recessed as shown at 5 to receive the guide clip constituting the present invention. This clip includes an intermediate arched portion 6 having terminal wings 7 and a roller 8 is journaled beneath the arched portion on a bolt 9 provided therefor, this roller constituting a bearing for the cutter or sickle bar. An arm 10 is extended from the intermediate portion of the clip and carries another roller 11 adapted to rest upon the sections 3.

The structure thus far described is already in use in mowers and similar structures. The present invention consists in the use of slots 12 formed in the wings 7 and having their walls flared upwardly. Thus the walls form seats for the tapered heads 13 of mower bolts 14 or the like which, as shown, are formed with angular portions 15 adapted to rest upon the guard bar 1.

If desired, and as shown in the drawings, a wear plate 16 can be positioned between the clip and the guard bar.

It will be noted that, by flaring the walls of the slots 12, bolts having tapered heads can be seated in the slots, leaving the clip free of projecting bolt heads on which grass is liable to become hung. Thus it is possible to employ the ordinary mower or reaper bolts instead of using the bolts of special sizes and shapes heretofore required for the purpose of attaching clips of this kind to guard bars.

What is claimed is:

The combination with a guard bar and sickle bar of a mower, of a guide clip mounted on the guard bar and overhanging the sickle bar, wings at opposite ends respectively of the clip, each wing having a slot formed with flared walls, and fastening bolts extending through the slots and guard bar, each bolt having a tapered head adapted to be seated in the slot with its top flush with the top of the wing, there being an angular portion at the inner end of the head constituting means for engaging the adjacent structure and preventing the clip from binding upon the guard bar.

In testimony that I claim the foregoing as my own, I have hereto affixed my signature.

THOMAS J. BARLOW.